Patented Mar. 3, 1953

2,630,370

UNITED STATES PATENT OFFICE 2,630,370

ZIRCONIUM COMPOUND AND METHOD OF PRECIPITATION

Charles A. Kumins, Tuckahoe, N. Y.

No Drawing. Application April 28, 1948,
Serial No. 23,873

7 Claims. (Cl. 23—16)

This invention relates to the quantitative precipitation of zirconium as a new chemical compound, zirconium mandelate. It aims to provide a method for quantitatively separating zirconium from associated metallic elements in a pure form as the new mandelate, and to make possible the easy preparation of pure zirconium hydroxide, oxide, and zirconium salts.

I have discovered that zirconium may be quantitatively separated from associated metallic elements by precipitation from an aqueous acid solution under non-oxidizing conditions, using as precipitant an aqueous solution of mandelic acid. It was most unexpected to find that mandelic acid was thus specific for zirconium. The precipitated zirconium mandelate is recoverable in pure form, and from it equally pure zirconium hydroxide, oxide, and salts may be prepared readily.

In practising my invention, a solution comprising zirconium is acidified to contain approximately five percent of free acid of a non-oxidizing type, suitably hydrochloric; an aqueous solution of mandelic acid containing at least the stoichiometric equivalent of zirconium is added; and the precipitated zirconium mandelate is separated from the reaction medium, as by filtration. The precipitate formed is zirconium tetra-mandelate. The precipitation is preferably carried out at room temperature, followed by heating below 100° C. and above 80° C. for a short time to give an easily filterable precipitate. The mandelate is washed several times on the filter with an aqueous solution containing a small amount of non-oxidizing and mandelic acids, for example, two percent hydrochloric and five percent mandelic acid.

The zirconium mandelate so obtained is ignited to the oxide, yielding a remarkably pure product. Alternatively, the zirconium mandelate may be dissolved in an aqueous solution of fixed alkali, such as of sodium hydroxide, from which zirconium hydroxide is immediately precipitated. Again, a pure zirconium hydroxide may be recovered. It has been found that ammonium hydroxide will not precipitate zirconium hydroxide from zirconium mandelate, forming a soluble complex with the latter instead. Both the pure zirconium oxide and hydroxide may be used to prepare pure zirconium salts. Of economic importance is the fact that mandelic acid which is used in excess in precipitation and in washing the zirconium mandelate precipitate, as well as that liberated in hydrolysis of zirconium mandelate with fixed alkali, is largely recoverable.

The following examples are given for purposes of illustration only.

EXAMPLE 1

50 milliliters of 16% mandelic acid (w./v.) was added to a zirconyl chloride solution, made by dissolving 0.1109 gram of zirconium oxide in 10 mls. concentrated HCl solution. After dilution with water to 100 mls., the mixture was heated to 85° C. for twenty minutes. The resulting precipitate was filtered off, washed with a hot solution containing 2% HCl and 5% mandelic acid (the precipitate was found to be sufficiently soluble in pure water to give low results), and ignited to the oxide. The results were:

Mandelic acid method: 0.1111 g. $ZrO_2$
Cupferron standard method: 0.1109 g. $ZrO_2$ The $ZrO_2$ recovered was found to be of exceptionally high purity.

EXAMPLE 2

The procedure of Example 1 was repeated, using, however, the stoichiometric equivalent of mandelic acid. It was found necessary, for quantitative results, to continue heating at approximately 90° C. for 10 hours, compared with twenty minutes' heating at 85° C., as in Example 1.

EXAMPLE 3

The procedure of Example 1 was repeated, using, however, 2½ times the stoichiometric equivalent of mandelic acid. For quantitative results, it was necessary to continue heating the reactants at approximately 90° C. for thirty minutes, compared with twenty minutes' heating at 85° C., as in Example 1.

EXAMPLE 4

*Separation of zirconium from titanium, aluminum, iron and vanadium*

Hydrochloric acid solutions containing Ti, Al, Fe and V as impurities were mixed with an aliquot sample of a zirconyl chloride solution previously standardized by the Cupferron method, and the Zr content was determined with mandelic acid by the method of Example 1.

[$ZrO_2$ present in sample, 0.1109 gram.]

| Impurity | $ZrO_2$ Found | Difference |
|---|---|---|
| | Grams | Grams |
| 1. 0.3300 g. $Fe_2O_3$ as $FeNH_4(SO_4)_2$ | 0.1109 | 0.0000 |
| 2. 0.1320 g. $Al_2O_3$ as $Al_2(SO_4)_3$ | 0.1107 | −0.0002 |
| 3. 0.1420 g. $TiO_2$ as $TiCl_4$ soln | 0.1107 | −0.0002 |
| 4. Adding 2 and 3 | 0.1107 | −0.0002 |
| 5. Adding 1, 2 and 3 | [1] 0.0221 | 0.0000 |
| 6. 0.0010 g. V as $NH_4VO_3+5$ | [2] 0.0500 | −0.0002 |

[1] Sample contained 0.0221 gram of $ZrO_2$.
[2] Sample contained 0.0502 gram of $ZrO_2$.

EXAMPLE 5

*Separation of zirconium from chromium, tin, bismuth, antimony, cerium, calcium, thorium, copper, cadmium, and barium*

Similarly to Example 4 in all respects but impurities, Zr was quantitatively precipitated and separated from Cr, Sn, Bi, Sb, Ce, Ca, Th, Cu, Cd and Ba.

[ZrO₂ present in sample, 0.1109 gram.]

| Impurity | ZrO₂ Found | Difference |
|---|---|---|
| | Grams | Grams |
| 1. 0.663 g. SnO₂ as SnCl₄ | 0.1114 | +0.0005 |
| 2. 0.736 g. Bi₂O₃ as BiOCl | 0.1113 | +0.0004 |
| 3. 0.640 g. Sb₂O₃ as SbOCl | 0.1113 | +0.0004 |
| 4. 1.880 g. BaO as BaCl₂ | 0.1109 | 0.0000 |
| 5. 0.953 g. CdO as CdCl₂ | 0.1109 | 0.0000 |
| 6. 0.681 g. ThO₂ as Th(NO₃)₄ | 0.1111 | +0.0002 |
| 7. 0.530 g. CuO as CuSO₄ | 0.1108 | −0.0001 |
| 8. 0.720 g. Cr₂O₃ as CrCl₃ | 0.1108 | −0.0001 |
| 9. 0.300 g. CaO as CaCl₂ | 0.1111 | +0.0002 |
| 10. 0.200 g. CeO₂ as Ce(SO₄)₂ | 0.1112 | +0.0003 |
| 11. Adding 1 to 10, inclusive, 7 substituted by its corresponding chloride, 10 by its corresponding basic nitrate | 0.1120 | +0.0011 |

In Examples 4 and 5, molar ratios of oxide impurities to zirconia ranged from about 6:1 to 15:1. It was found that the unstable salts of Th, Sb, Sn and Bi gave the higher results of Example 5, sample 11, due to hydrolysis of their salts to the basic, insoluble ones. This is remedied by heating the mixed solution to boiling and filtering off the hydrolyzed salts before precipitation of Zr with mandelic acid as indicated previously.

EXAMPLE 6

Following the procedure of Example 1, it was found that the chlorides of sodium, potassium, cobalt, nickel and manganese did not interfere with the precipitation of zirconium mandelate even when the amounts of these cations were present in weight ratios to zirconium as high as 10:1.

EXAMPLE 7

Three samples of zirkite ore were fused with borax, and the melts dissolved in dilute (1:5) hydrochloric acid. Aliquots containing approximately 0.1 gram of zirconium oxide were treated with 50 ml. of 16% mandelic acid, as described previously, and the zirconium mandelate filtered off and washed free of impurities, as heretofore indicated. The results obtained were in substantial agreement with those obtained by the Cupferron method, as shown in the following table:

Analyses of zirkite ore

| Mandelic Acid, percent Zr | Cupferron, percent Zr |
|---|---|
| 70.50 | 70.30 |
| 70.40 | 70.38 |
| 70.44 | 70.26 |
| Average 70.45 | 70.31 |

EXAMPLE 8

Three separate preparations of zirconium mandelate were prepared by reacting a solution C. P. zirconium oxychloride in 5% hydrochloric acid with 16% mandelic acid, according to the method of Example 1. The precipitate was filtered, washed free of water-soluble salts, and dried at 110° C. for 16 hours. The precipitates were analyzed separately, zirconium being determined by ignition to the oxide and the carbon and nitrogen by the standard method of Pregl (Roth and Daw: Quantitative Organic Microanalysis of Fritz Pregl, 1937). The individual results, shown by the following table, agree with the theoretic tetramandelate $$Zr(OCOCHOHC_6H_5)_4$$

the averages of the analyses being:

Analyses of zirconium mandelate complex

| Element | Actual Percent | Theoretic Percent |
|---|---|---|
| Zr | 13.29 | 13.10 |
| C | 55.19 | 55.20 |
| H | 4.31 | 4.03 |
| O (difference) | 27.21 | 27.60 |

The method of my invention provides a ready and efficient method for quantitatively precipitating and separating zirconium from associated cationic impurities as the new chemical compound, zirconium tetramandelate. This new compound is recoverable in a pure state, and the oxide and hydroxide prepared therefrom provide ready starting materials for the preparation of equally pure zirconium compounds and elemental zirconium.

I claim:

1. Method for quantitatively precipitating and separating zirconium from cationic impurities, which comprises adding at least the stoichiometric equivalent of mandelic acid to an aqueous acidic solution comprising zirconium under non-oxidizing conditions, and separating the precipitated zirconium tetramandelate.

2. Method of claim 1, in which an excess of mandelic acid is used.

3. Method of claim 1, in which the precipitation of zirconium tetramandelate is followed by heating the reaction medium to 80° C. to 100° C. for a short time, prior to separating the precipitate from the reaction medium.

4. Method of claim 1, in which the precipitated zirconium tetramandelate is filtered off and washed with a hot, dilute, aqueous solution of hydrochloric and mandelic acids.

5. Method of claim 1, in which the zirconium tetramandelate is ignited to the oxide.

6. Method of claim 1, in which the zirconium tetramandelate is hydrolyzed to the corresponding hydroxide.

7. Zirconium tetramandelate.

CHARLES A. KUMINS.

REFERENCES CITED

The following references are of record in the file of this patent:

UNITED STATES PATENTS

| Number | Name | Date |
|---|---|---|
| 2,498,514 | Mater | Feb. 21, 1950 |

OTHER REFERENCES

Berichte, vol. 40 (1907), pages 808–812.

McKenzie: "Jour. Chem. Soc. (London)," vol. 75, pt. II (1899), pages 968–969.

Mandl: "Zeit. anorg. Chemie," vol. 37 (1903), pages 257 to 261.

Jantsch: "Jour. praktische Chemie" (2), vol. 115 (1927), pages 7 to 23.